(12) United States Patent
McFarland

(10) Patent No.: US 9,590,858 B2
(45) Date of Patent: *Mar. 7, 2017

(54) IDENTIFYING A NEAREST CONNECTION

(71) Applicant: Assurant Design Automation LLC, Kennesaw, GA (US)

(72) Inventor: M. David McFarland, Kennesaw, GA (US)

(73) Assignee: Assurant Design Automation LLC, Kennesaw, GA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/727,614

(22) Filed: Jun. 1, 2015

(65) Prior Publication Data

US 2016/0352580 A1    Dec. 1, 2016

(51) Int. Cl.
*H04L 12/28* (2006.01)
*H04L 12/24* (2006.01)

(52) U.S. Cl.
CPC ................... *H04L 41/12* (2013.01)

(58) Field of Classification Search
CPC ......... H04L 41/12; H04L 45/02; H04L 41/00; H04W 84/18
USPC ................................. 370/255, 254
See application file for complete search history.

(56) References Cited

U.S. PATENT DOCUMENTS

| | | | |
|---|---|---|---|
| 4,065,915 A | 1/1978 | Farnbach | |
| 6,215,327 B1 | 4/2001 | Lyke | |
| 6,628,215 B2 | 9/2003 | Talwar et al. | |
| 6,654,950 B1 | 11/2003 | Barnishan | |
| 6,898,563 B1 | 5/2005 | McFarland | |
| 7,346,864 B2 | 3/2008 | Srouji et al. | |
| 7,605,607 B2 | 10/2009 | Ng | |
| 7,784,005 B1 | 8/2010 | Ng | |
| 7,890,896 B2 | 2/2011 | Moon | |
| 8,739,084 B2 | 5/2014 | Swann | |
| 9,112,490 B1 | 8/2015 | Hamlet et al. | |
| 9,396,298 B1 * | 7/2016 | McFarland | G06F 17/505 |
| 2013/0019215 A1 | 1/2013 | Swann | |
| 2013/0125104 A1 | 5/2013 | Valluri et al. | |
| 2014/0085979 A1 | 3/2014 | Kono | |

* cited by examiner

*Primary Examiner* — Chi H Pham
*Assistant Examiner* — Alexander O Boakye
(74) *Attorney, Agent, or Firm* — Kunzler Law Group; Scott D. Thorpe

(57) ABSTRACT

For identifying a nearest connection is disclosed. The method encodes node data as a linear array that includes a plurality of logic states. Each logic state represents a node of node data. The method identifies a valid connection policy for a valid connection element between two logic states of a plurality of logic states. The method further generates a connection element between each two logic states of the plurality of logic states that satisfy the valid connection policy through a combination map. In addition, the method iteratively generates a connection weight sum for each node connection between a start state and an end state. The method further identifies a first node connection between the start state and the end state with a minimum connection weight sum as a nearest node connection.

20 Claims, 24 Drawing Sheets

150

| Logic Transformation ID |
| 155 |
| Binary Output Variables |
| 225 |
| Next State Values |
| 230 |
| Input Data |
| 160 |
| Input Data |
| 160 |
| Input Data |
| 160 |

160

| Input ID |
| 165 |
| Binary Input Variable |
| 215 |
| Binary Input Variable |
| 215 |
| Binary Input Variable |
| 215 |

205 

```
┌─────────────────────┐
│   Logic State ID    │
│        210          │
└─────────────────────┘
```

| Maxterms 235 | | Binary Input Variable 215 | Not Logic 340 |
|---|---|---|---|
| Maxterms 235 | | Binary Input Variable 215 | Not Logic 340 |
| ⋮ | | ⋮ | ⋮ |
| Maxterms 235 | | Binary Input Variable 215 | Not Logic 340 |

| Minterms 240 | Binary Output Variable 225 |
|---|---|
| Minterms 240 | Binary Output Variable 225 |
| ⋮ | ⋮ |
| Minterms 240 | Binary Output Variable 225 |

| Present State Value 220 | Next State Value 230 |
|---|---|
| Present State Value 220 | Next State Value 230 |
| ⋮ | ⋮ |
| Present State Value 220 | Next State Value 230 |

```
┌─────────────────────┐
│ State Transitions Value │
│         343         │
└─────────────────────┘
```

| Logic Element ID |
| 450 |
| Assertion Indicator |
| 295 |
| Assertion Value |
| 290 |

175

| Connection ID |
| 255 |
| Source Field |
| 260 |
| Destination Field |
| 265 |
| Field Assertion Indicator Data |
| 170 |

185 →

| Logic Element ID |
| 450 |
| Logic Element Type |
| 455 |
| Input IDs |
| 456 |
| Output IDs |
| 457 |
| Partition ID |
| 459 |
| Execution Time |
| 377 |
| Package ID |
| 461 |

FIG. 2J

FIG. 2K
FIG. 2L

IDENTIFYING A NEAREST CONNECTION

FIELD

The subject matter disclosed herein relates to identifying a nearest connection between nodes.

BACKGROUND

Description of the Related Art

Events may be characterized with logical elements and logical element relationships.

BRIEF SUMMARY

A method for identifying a nearest connection is disclosed. The method encodes node data as a linear array that includes a plurality of logic states. Each logic state represents a node of node data and each logic state includes one or more binary output variables, one or more binary input variables, one or more minterms of the one or more binary input variables, one or more maxterms of the one or more minterms, one or more present state values, and one or more next state values. The method identifies a valid connection policy for a valid connection element between two logic states of a plurality of logic states. The method further generates a connection element between each two logic states of the plurality of logic states that satisfy the valid connection policy through a combination map. Each connection element comprises a connection weight. In addition, the method iteratively generates a connection weight sum for each node connection between a start state and an end state. Each node connection comprises one or more connection elements and a given connection element is not traversed to generate the connection weight sum in response to the node connection satisfying a traversal policy. The method further identifies a first node connection between the start state and the end state with a minimum connection weight sum as a nearest node connection. A program product and apparatus also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2F is a schematic block diagram illustrating one embodiment of a logic state;

FIG. 2J is a schematic block diagram illustrating one embodiment of logic element data;

FIG. 2K is a schematic block diagram illustrating one embodiment of connection element data;

FIG. 2L is a schematic block diagram illustrating one embodiment of node connection data;

DETAILED DESCRIPTION

Figure 1A:
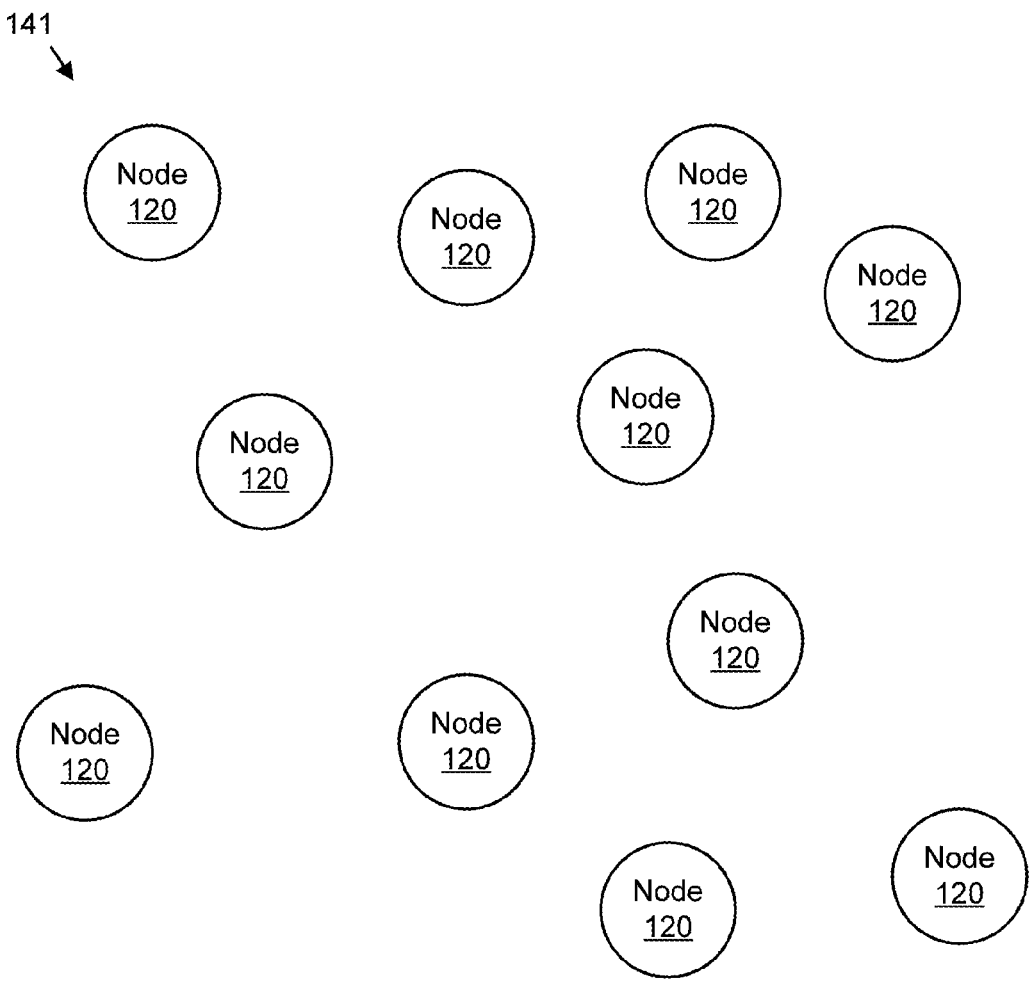
FIG. 1A is a schematic diagram illustrating one embodiment of node data.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Ada, Python, Ruby, Java, Smalltalk, C++, or the like, and conventional procedural programming languages, such as the "C" programming language, SQL, relay ladder logic, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic diagram illustrating one embodiment of node data 141 in a logical space. The node data 141 includes a plurality of nodes 120. Each node 120 may be an event, a transaction, an observation, or the like. Each node 120 may be an entry from one or more databases. The databases may include disparate types of information. For example, the nodes 120 may be from financial transaction databases, telephone communication databases, observational databases, and the like.

Because of the differences between the nodes 120, it is difficult to infer connections between the nodes 120. The embodiments described herein identify connections between the nodes 120. In particular, the embodiments identify a nearest connection between two nodes 120 as will be described hereafter.

Figure 1B:
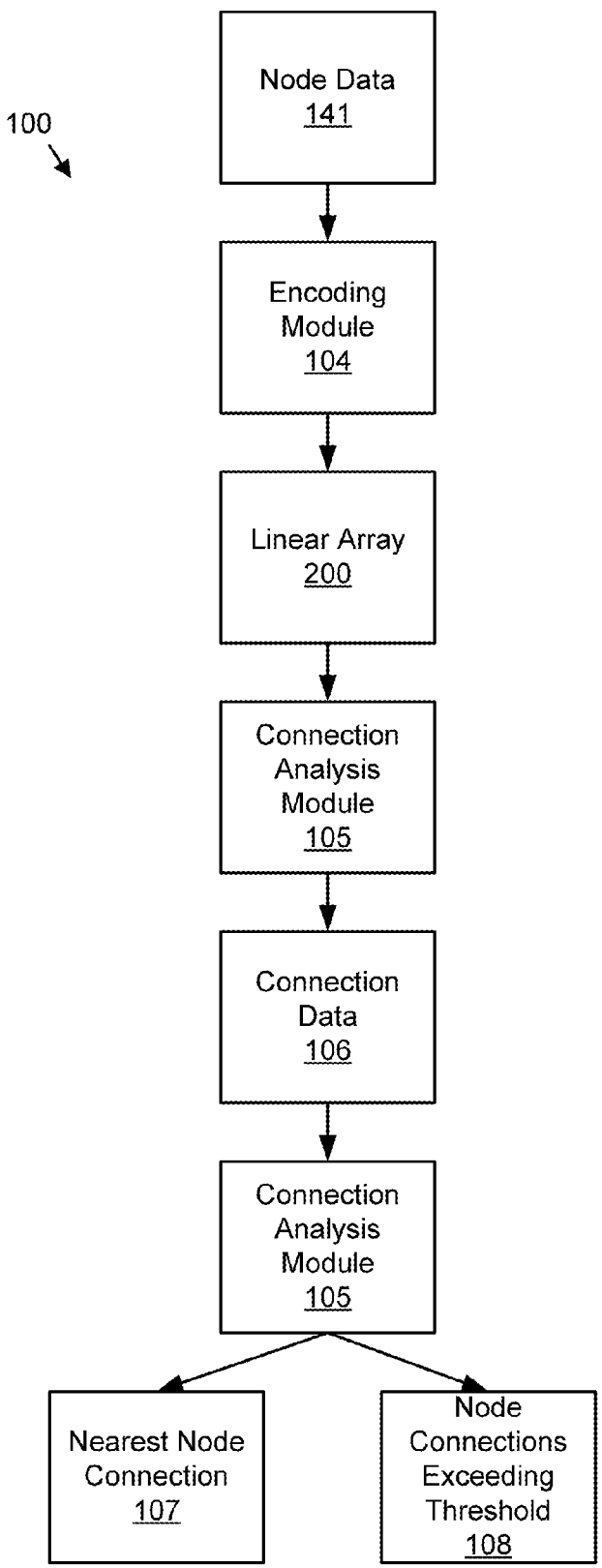
FIG. 1B is a schematic block diagram illustrating one embodiment of a nearest node connection identification process.

FIG. 1B is a schematic block diagram illustrating one embodiment of a nearest connection identification process 100. The process 100 identifies a nearest node connection 107 for the plurality of nodes 120 in the node data 141. In addition, the process 100 identifies node connections exceeding a connection weight sum threshold 108 as will be described hereafter.

Each node 120 of the node data 141 typically specifies a plurality of inputs, conditions, actions, outputs, event states and/or decision flows, referred to hereinafter as connection elements. In addition, the node data 141 specifies some of the interactions between the connection elements.

Numerous potential connection element relationships may exist between the connection elements. It may be desirable to analyze the node data 141 and determine connections between the nodes based on the logical elements in the event data 141. For example, it may be advantageous to determine the nearest connection 107 between two nodes in the node data 141. Unfortunately, the complexity of the node data 141 often makes manipulating and analyzing the connections between the node data 141 difficult. Describing all of the possible connection element relationships between the connection elements results in the generation of a data structure of at least $2^N$ connection element relationships, where N is the number of connection elements. As a result, even for modest sets of node data 141, the node data 141 generates connection element relationships that are intractably complex.

In the embodiments described herein, the encoding module 105 encodes the node data 141 into a linear array 200. The linear array 200 reduces the complexity of the connection element relationships of the node data 141. As a result, a connection analysis module 105 may more easily manipulate the connection element relationships and generate connection data 106 from the connection element relationships as will be described hereafter.

The connection analysis module 105 may further analyze the connection data 106 to determine a nearest connection 107 between nodes in the node data 141. As a result, very large sets of node data 141 may be analyzed to find the nearest connection 107.

Figure 1C:
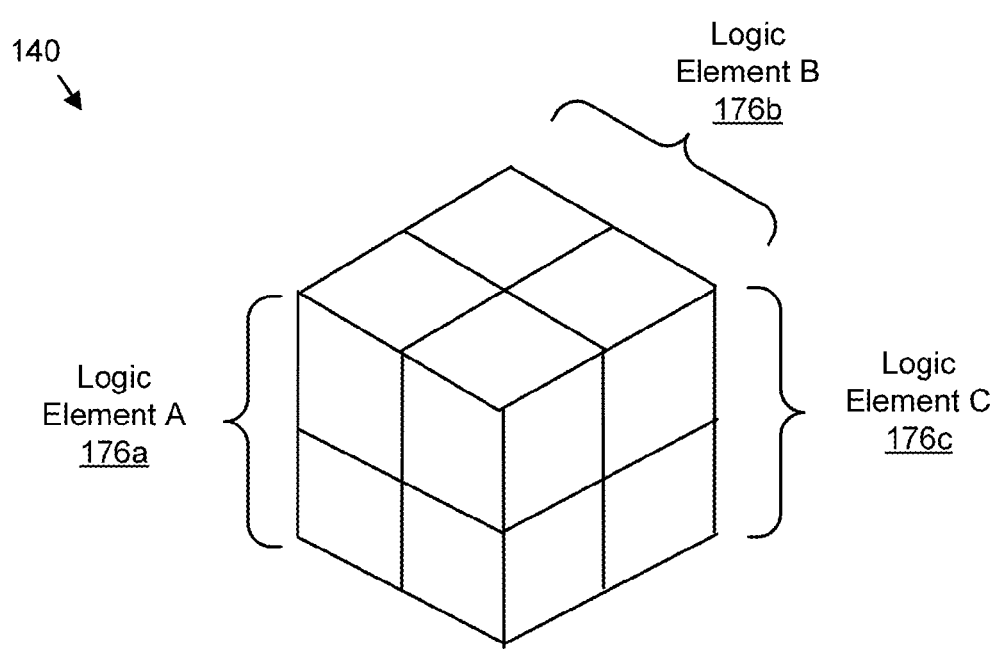
FIG. 1C is a drawing illustrating one embodiment of a multidimensional logical array.

FIG. 1C is a drawing illustrating one embodiment of a multidimensional logical array 140. For simplicity, the multidimensional logical array 140 is shown for node data 141 with three connection elements 176. As shown, the multidimensional logic array node data 141d for only three connection elements 176 results in $2^N$ or 8 possible connection element relationships. For even modest sets of node data 141, the number of connection element relationships quickly becomes intractable. The embodiments described herein encode the node data 141 into the linear array 200. The linear array 200 may be analyzed to identify connection elements between the nodes 120. In addition, the connection elements may be analyzed to identify a nearest connection 107 between two specified nodes 120.

Figure 1D:
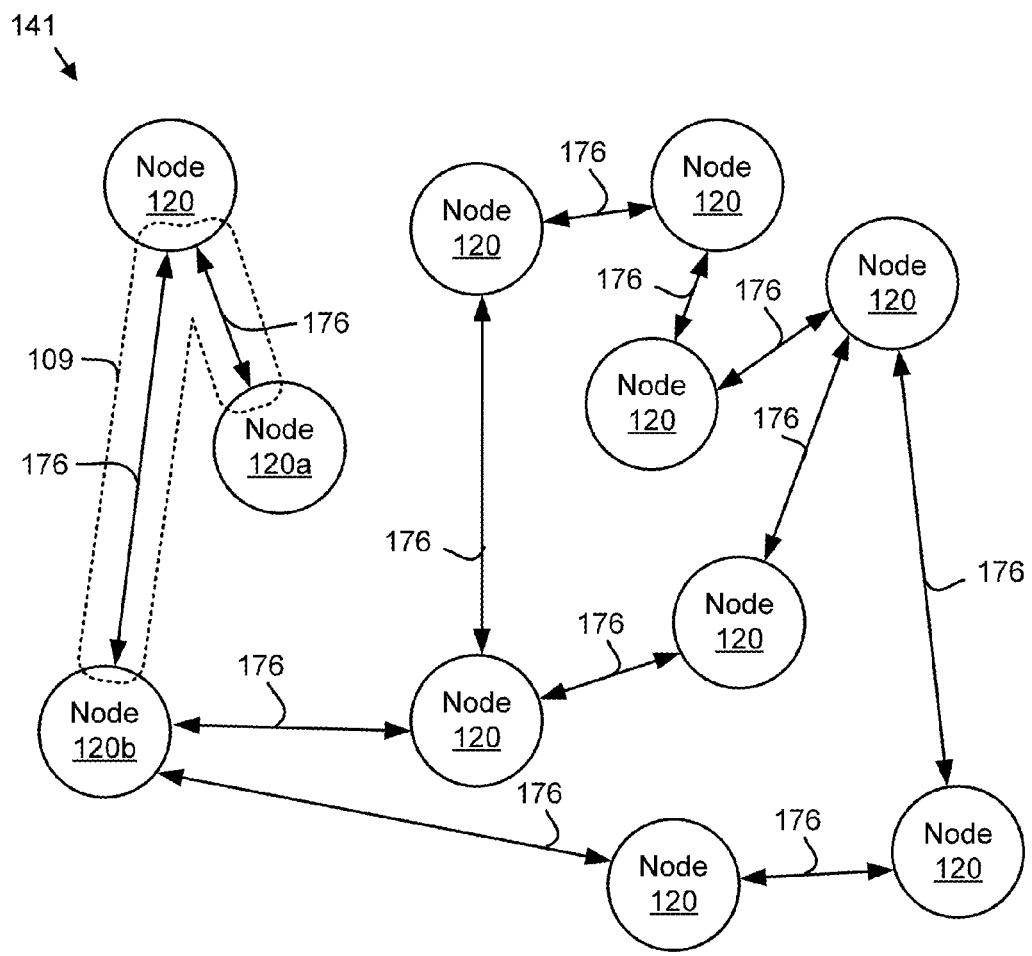
FIG. 1D is a schematic diagram illustrating one embodiment of node data and connection elements.

FIG. 1D is a schematic block diagram illustrating one embodiment of node data 120 and connection elements 176. In the depicted embodiment, connection elements 176 are identified between nodes 120 of the node data 141 of FIG. 1A. The connection elements 176 may be included in the connection data 106. The connection elements 176 may be analyzed to identify relationships between the nodes 120 more rapidly than would be possible with a brute force analysis of the node data 141 as will be described hereafter.

In the depicted embodiment, a node connection 109 is shown comprising two connection elements 176. The node connection 109 may be between a start node 120a and an end node 120b.

Figure 1E:
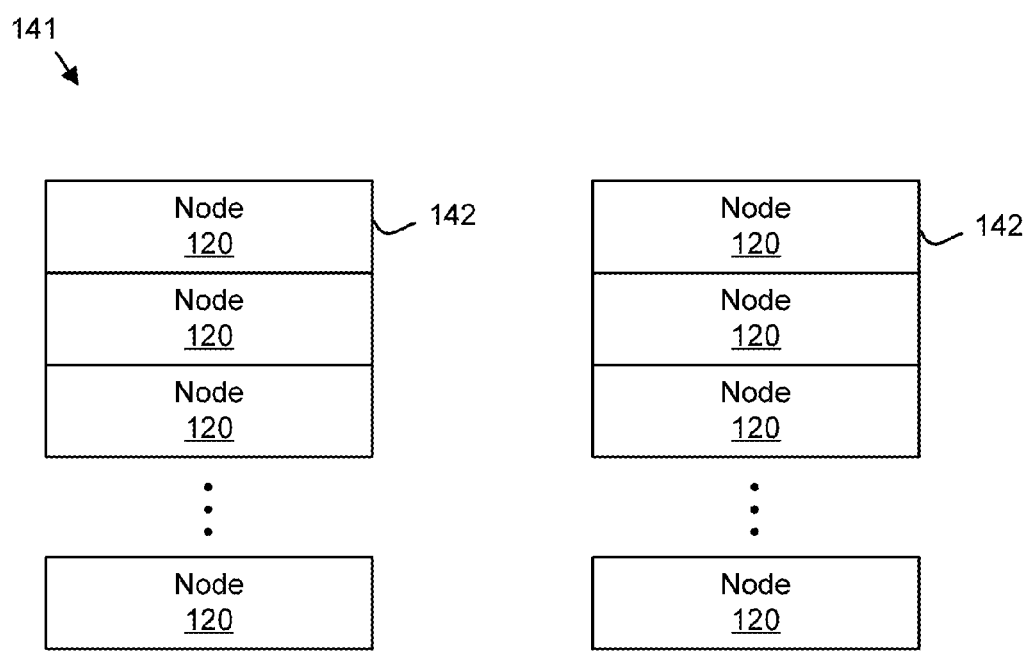
FIG. 1E is a schematic block diagram illustrating one alternate embodiment of node data.

FIG. 1E is a schematic block diagram illustrating one embodiment of the node data 141. The node data 141 may be organized as a data structure in a memory. In addition, the node data 141 maybe organized as one or more source databases 142. The node data 141 includes a plurality of nodes 120.

Figure 2A:
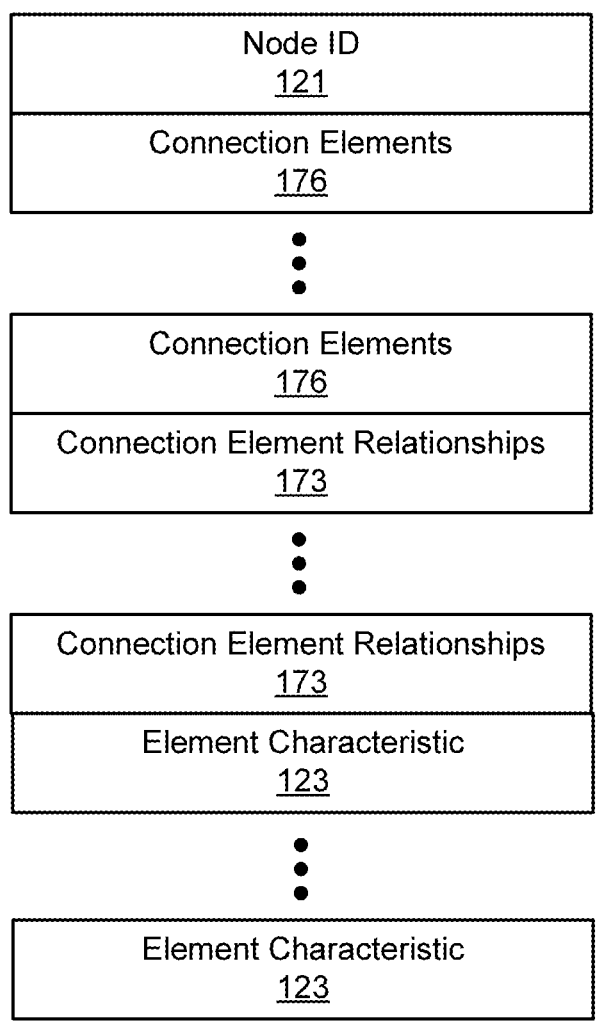
FIG. 2A is a schematic block diagram illustrating one embodiment of a node.

FIG. 2A is a schematic block diagram illustrating one embodiment of a node 120 of the node data 141. Each node 120 maybe organized as a data structure, database entry, a flat file, or combinations thereof. The data organization of the node may depend upon the organization of the source database 142. Each node 120 may include one or more connection elements 176 and/or one or more connection element relationships 173.

Connection elements 176 may be persons, places, actions, things, concepts, and the like. Connection element relationships 173 may be interactions of one or more connection elements. For example, a first connection element 176 may be a first person. A first connection element relationship 173 may be a telephone call from the first person to a second person. The second person may be a second connection element 176. Connection element relationships 173 may include communications, travel, transfers, proximity, interpersonal relationships, and the like.

The node 120 also includes one or more element characteristics 123. The element characteristics 123 may include metrics for the connection element 176 and/or the connection element relationships 173. For example, the element characteristics 123 may include a time of a communication.

Figure 2B:
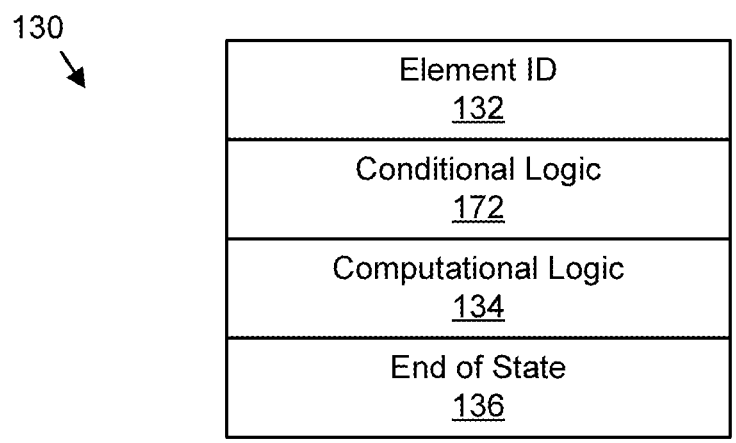
FIG. 2B is a schematic block diagram illustrating one embodiment of a logic design element.

FIG. 2B is a schematic block diagram illustrating one embodiment of a logic design element 130. The logic design element 130 maybe organized as a data structure in a memory. Each logic design element 130 may be parsed from a node 120. In the depicted embodiment, the logic design element 130 includes an input identifier 132, conditional logic 172, computational logic 134, and an end of state 136.

The element identifier 132 may uniquely identify the logic design element 130. The element identifier 132 includes the source database 141. In addition, the element identifier 132 may comprise a range of line numbers for a text file, a data structure reference number, or combinations thereof.

The conditional logic 172 may include one or more connection elements 176 and element characteristics 123. The conditional logic 172 defines the conditions surrounding the connection element relationship 173.

The computational logic 134 may includes one or more connection element relationships 173. For example, the computational logic 134 may include two telephone communications.

The end of state 136 may indicate an end of the conditional logic 172 and the computational logic 134 associated with the element identifier 132. The end of state 136 may separate two or more instances of conditional logic 172 in the logic design element 130.

Figure 2C:
FIG. 2C is a schematic block diagram illustrating one embodiment of a logic transformation.

FIG. 2C is a schematic block diagram illustrating one embodiment of a logic transformation 150. The logic transformation 150 may be generated from the logic design element 130. The logic transformation 150 maybe organized as a data structure in a memory. In the depicted embodiment, the logic transformation 150 includes a logic transformation identifier 155, binary output variables 225, next state values 230, and input data 160.

The binary output variables 225 maybe parsed from control conditions for the node data 141. In one embodiment, the binary output variables are generated from the computational logic 134. In addition, the binary output variables 225 may identify data structures such as numerical values, alphanumeric values, logical values, dates, times, and the like. In one embodiment, the logic design element 130 is parsed to identify each binary output variable 225 from the computational logic 134.

The next state values 230 may define logical states. In one embodiment, the next state values 230 comprise an element identifier 132 for a logic design element 130. In addition, the next state values 230 may include one or more binary state values as will be described hereafter.

The input data 160 may define inputs that generate the binary output variables 225 and the next state values 230. In one embodiment, input data 160 is generated for each binary output variable 225 and each next state value 230.

Figure 2D:
FIG. 2D is a schematic block diagram illustrating one embodiment of input data.

FIG. 2D is a schematic block diagram illustrating one embodiment of input data 160. The input data 160 maybe organized as a data structure in a memory. In the depicted embodiment, the input data 160 includes an input identifier 165 and a plurality of binary input variables 215.

The input identifier 165 may uniquely identify the input data 160. The binary input variables 215 may be control signals conditions for the node data 141. Alternatively, the binary input variables 215 may identify data structures such as numerical values, alphanumeric values, logical values, dates, times, and the like.

Figure 2E:
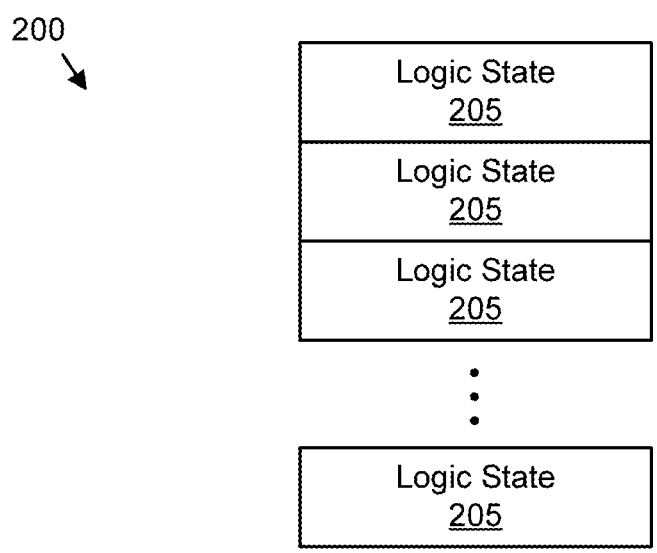
FIG. 2E is a schematic block diagram illustrating one embodiment of a linear array.

FIG. 2E is a schematic block diagram illustrating one embodiment of a linear array 200. The linear array 200 may be generated from the logic transformation 150. The linear array 200 maybe organized as a data structure in a memory. The linear array 200 includes a plurality of logic states 205.

FIG. 2F is a schematic block diagram illustrating one embodiment of a logic state 205. The logic state 205 maybe organized as a data structure in a memory. The logic state 205 includes a logic state identifier 210, one or more binary input variables 215, one or more binary output variables 225, one or more next state values 230, one or more present state values 220, one or more maxterms 235, one or more minterms 240, and a state transitions value 343.

The logic state identifier 210 may uniquely identify the logic state 205. The logic state identifier 210 may include a label, a mnemonic, or the like. In addition, the logic state identifier 210 may include a corresponding logic transformation identifier 155 for the logic transformation 150 that corresponds to the logic state 205.

The binary output variables 225 may include each binary output variable 225 from the logic design 140. Alternatively, the binary output variables 225 may include each binary output variable 225 identified for the corresponding logic transformation 150. In one embodiment, each binary output variable 225 is assigned an identifier such as a label, a logical representation, an index value, or the like.

The binary input variables 215 may include each binary input variable 215 from the logic design 140. In addition, the binary input variables 215 may include each binary input variable 215 identified for the corresponding logic transformation 150. NOT logic 340 may be associated with each binary input variable 215. The NOT logic 340 indicates whether an inverse of the binary input variable 215 is asserted. In one embodiment, each binary input variable 215 is assigned an identifier such as a label, a logical representation, an index value, or the like.

The present state values 220 may be binary values that uniquely define the logic state 205 as a binary value. The present state values 220 may uniquely describe the logic state identifier 210. The present state values 220 for each logic state 205 may be associated with a logic transformation identifier 155. In one embodiment, the present state values 220 may be selected reduce the complexity of the logic design 140. In one embodiment, each present state value 220 is assigned an identifier such as a label, a logical representation, an index value, or the like.

The next state values 230 may define one or more next states that are branched to as a function of the binary input variables 215. The next state values 230 may be a binary encoding of the next state values 230 of the logic transformation 150. In one embodiment, each next state value 230 is assigned an identifier such as a label, a logical representation, an index value, or the like.

Each minterm 240 may be a binary product or logical AND of one or more binary input variables 215 and/or one or more present state values 220. Alternatively, each minterm 240 may be a binary product of one or more maxterms 235. In one embodiment, each minterm 240 is assigned an identifier such as a label, a logical representation, an index value, or the like.

Each maxterm 235 may be a binary sum or logical OR of one or more minterms 240. Alternatively, each maxterm 235 may be a binary sum of one or more binary input variables 215 and/or one or more present state values 220. In one embodiment, each maxterm 235 is assigned an identifier such as a label, a logical representation, an index value, or the like.

The state transitions value 343 may record a number of state transitions that have been traversed from a current logic state 205 to subsequent logic states 205. A state transition transitions active control from the current logic state 205 to a subsequent logic state 205. For example, the current logic state 205 STATE00 may transition active control of a device or computer to subsequent state 205 STATE01.

In one embodiment, the state transitions value 343 is incremented each time a state transition from the current logic state 205 is traversed. Alternatively, the state transitions value 343 records a total number of state transitions from the current logic state 205 to subsequent logic states 205.

The plurality of logic states 205 in the linear array 200 represents the multidimensional array of the node data 141 in a form that is more easily manipulated and analyzed. As a result, logic element relationships may be identified, analyzed, and resolved as will be described hereafter.

Figure 2G:
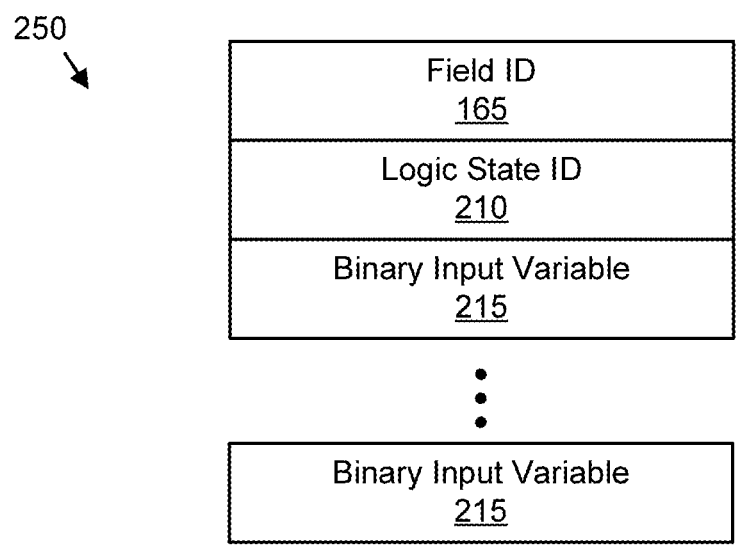
FIG. 2G is a schematic block diagram illustrating one embodiment of field data.

FIG. 2G is a schematic block diagram illustrating one embodiment of field data 250. The field data 250 describes a field in a combination map. The field data 250 maybe organized as a data structure in a memory. In the depicted embodiment, the field data 250 includes a field identifier 165, one or more logic state identifiers 210, and one or more binary input variables 215.

The field identifier 165 may uniquely identify the field in the combination map. The logic state identifier 210 may identify a logic state 205 associated with the field. Each field may represent at least one single logic state 205. The binary input variables 215 may indicate which of the binary input variables 215 for the logic state 205 is associated with the field.

Figure 2H:
FIG. 2H is a schematic block diagram illustrating one embodiment of assertion indicator data.

FIG. 2H is a schematic block diagram illustrating one embodiment of assertion indicator data 170. The assertion indicator data 170 may indicate whether a logic element 176 is asserted. The assertion indicator data 170 may be organized as a data structure in a memory. In the depicted embodiment, the assertion indicator data 170 includes a logic element identifier 450, an assertion indicator 295, and an assertion value 290.

The logic element identifier 450 associates the assertion indicator data 170 with a logic element 176. The assertion value 290 specifies whether binary input variables 215, present state values 220, minterms 240, maxterms 235, binary output variables 225, next state values 230, state values 315 and other logic elements 176 are asserted, deasserted, a DON'T CARE, undefined, or unknown.

In one embodiment, the assertion indicator 295 is of an indicator type selected from the group consisting of a color, a label, an arrow, an icon, hashing, and motion. For example, the indicator type may be a color with blue indicating that a field is asserted and read indicating that the field is deasserted.

Figure 2I:
FIG. 2I is a schematic block diagram illustrating one embodiment of connection data.

FIG. 2I is a schematic block diagram illustrating one embodiment of relationship arrow data 175. The relationship arrow data 175 may define a relationship arrow between fields of the combination map as will be described hereafter. The relationship arrow data 175 maybe organized as a data structure in a memory. In the depicted embodiment, the relationship arrow data 175 includes a connection identifier 255, a source field 260, a destination field 265, and the assertion indicator data 170.

The connection identifier 255 uniquely identifies a connection between the source field 260 and the destination field 265. The connection identifier 255 may be a label, an index, or the like.

The source field 260 may identify a first field that defines a first logical element relationship. The destination field 265 may identify one or more second fields that have second logical element relationships that include the first logical element relationship. For example, the source field 260 may define a first binary input variables 215 that are included the minterms 240 of the destination field 265. The destination field 265 may be a combination map. The assertion indicator data 170 may indicate if the source field 260 and/or the connection between the source field 260 and the destination field 265 are asserted.

FIG. 2J is a schematic block diagram illustrating one embodiment of logic element data 185 for a connection element 176. The logic element data 185 maybe organized as a data structure in memory. In the depicted embodiment, the logic element data 185 includes a logic element identifier 450, a logic element type 455, one or more input identifiers 456, one or more output identifiers 457, a partition identifier 459, an execution time 377, and a package identifier 461.

The logic element identifier 450 may uniquely identify the logic element 176. The logic element identifier 450 may be a label, an index, or the like.

The logic element type 455 may specify a type such as a binary input variable 215, a binary output variable 225, the minterm 240, a maxterm 235, a present state value 220, a next state value 230, not logic 340, a state transition between logic states 205, and the like. Alternatively, the logic element type 455 may specify a connection element 176 or a node connection 109.

The input identifiers 456 may list the logic element identifiers 450 of inputs such as binary inputs 177 to the connection element 176. The output identifiers 457 may list the logic element identifiers 450 of connection elements 176 receiving outputs from the connection elements 176.

The partition identifier 459 may specify a partition that the logic connection element 176 is assigned to.

The execution time 377 may specify one or more of a minimum time for a state transition, a maximum time for a state transition, an average time for a state transition, a mean time for a state transition, a medium time for a state transition, the simulation generated time for a state transition, or the like.

The package identifier 461 may specify a destination package for the logic element. The destination package may be a defined package or a computational package. The defined package and the computational package may be used to validate the linear array 200.

FIG. 2K is a schematic block diagram illustrating one embodiment of connection element data 242. The connection element data 242 maybe organized as a data structure in a memory. In the depicted embodiment, the connection element data 242 includes a connection element identifier 244, one or more logic state identifiers 210, and a pathway weight 246.

The connection element identifier 244 may identify a connection element 176. The connection element identifier 244 may be an index. The logic state identifiers 210 identify the logic states 205 connected by the connection element 176. The connection weight 246 may describe a strength of the connection between the logic states 205. The connection weight 246 may be a time interval. The time interval may be a communication time interval.

Alternatively, the connection weight 246 may be an activity metric. The activity metric may measure a quantity of an activity associated with the connection element 176. For example, the activity metric may be an amount of a financial transaction.

FIG. 2L is a schematic block diagram illustrating one embodiment of node connection data 252. The node connection data 252 maybe organized as a data structure in a memory. The node connection data 252 may describe a node connection 109 of a plurality of connection elements 176 between a start state and an end state. For example, a start state may be connected to an end state by three connection elements 176. The three connection elements 176 form the node connection 109.

In the depicted embodiment, the node connection data 252 includes one or more connection element identifiers 244 and a connection weight sum 256. The connection element identifiers 244 may identify one or more connection elements 176 that connect a start logic state 205 or start state to an end logic state 205 or end state. The connection weight sum 256 may be the mathematical sum of the connection weights 246 for each connection element 176 of the node connection data 252.

Figure 3A:
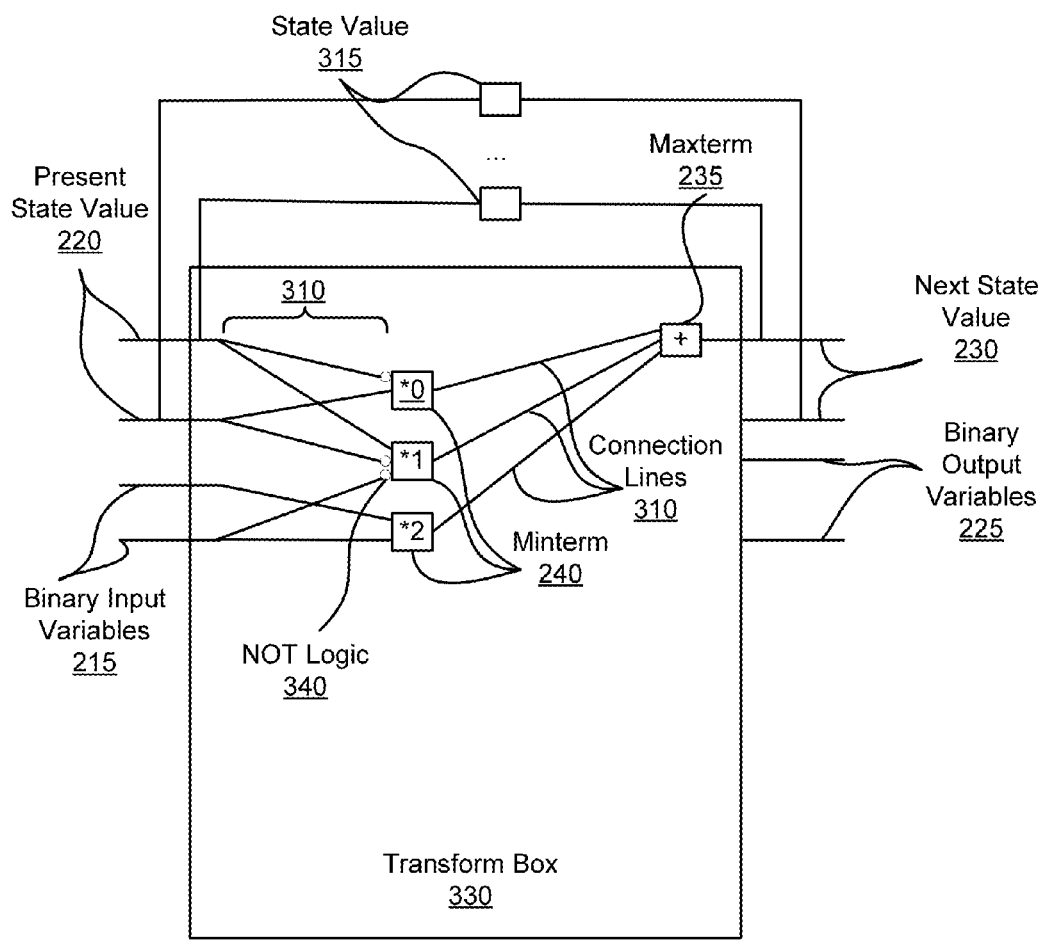
FIG. 3A is a schematic block diagram illustrating one embodiment of a transform box.

FIG. 3A is a schematic block diagram illustrating one embodiment of a transform box 330. The transform box 330 represents one or more logic states 205 as combinatorial logic. The transform box 330 allows undefined connection element relationships to be identified and resolved. Each transform box 330 may be associated with at least one logic state 205 and the field data 250 for the at least one logic state 205. The transform box 330 may be presented as a graphical user interface (GUI) on display. The elements of the transform box 330 may be manipulated by user. In the depicted embodiment, the elements of the transform box 330 include state values 315, the present state values 220, the next state values 230, the binary input variables 215, the NOT logic 340, one or more minterms 240, and one or more maxterms 235. In the depicted embodiment, the transform box 330 shows sum of products logic. Alternatively, the transform box 330 may display product of sums logic.

In one embodiment, only one maxterm 235 is displayed at a given time. Alternatively, each maxterm 235 for the logic state 205 may be displayed at a given time. Each maxterm 235 is represented as a logical sum of one or more minterms 240. Each maxterm 235 defines one or more of a next state value 230 and a binary output variable 225. Alternatively, only one minterm 240 may be displayed for product of sums logic.

Each minterm 240 may be displayed as a function of one or more binary input variables 215 and the NOT logic 340 associated with the binary input variables 215. In addition, each minterm 240 may be displayed as a function of the present state values 220.

The state values 315 may indicate previous next state values 230 that define the present state values 220. The next state values 230 define a next logic state 205. The binary output variables 225 define the actions 174 of the logic state 205.

Connection lines 310 may show the logical relationship of the binary input variables 215 and present state values 220 to minterms 240 and NOT logic 340. In addition, the connection lines 310 may show the logical relationship of the minterms 240 to the maxterms 235. Assertion indicator data 170 may define an assertion value for each connection line 310. A Boolean expression may be derived from the connection lines 310, binary input variables 215, present state values 220, NOT logic 340, minterms 240, and maxterms 235.

In one embodiment, a user may modify a logic state 205 by editing the displayed present state values 220, binary input variables 215, NOT logic 340, minterms 240, maxterms 235, next state values 230, binary output variables 225, and connection lines 310.

Figure 3B:
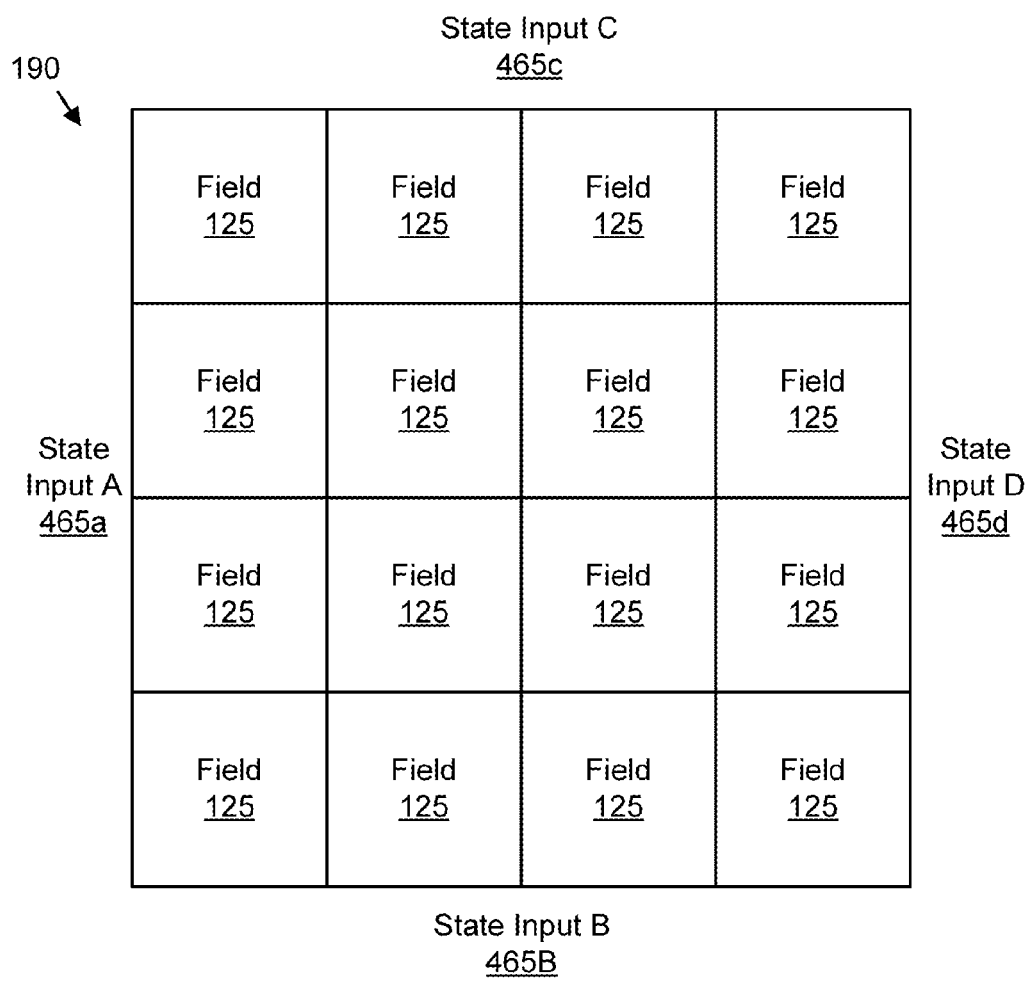
FIG. 3B is a drawing illustrating one embodiment of a combination map.

FIG. 3B is a drawing illustrating one embodiment of a combination map 190. In the depicted embodiment, fields 125 are shown for four state inputs 465. Each state input 465 is one of a binary input variable 215 and a present state value 220. Each field 125 is associated with unique field data 250. Each field 125 may represent a logic state 205. Alternatively, each field 125 may represent a plurality of binary input variables 215 as will be shown in FIG. 3D.

In one embodiment, state inputs 465 are automatically organized into the plurality of fields 125. For example, present state values 220 may be assigned to fields of higher level combination maps 190 while binary input variables 215 may be assigned to lower level combination maps 190. In addition, binary input variables 215 that defined in for a larger number of minterms 235 may be assigned to higher level combination maps 190. In one embodiment, binary input variables 215 that are defined with differing assertion values 290 for a larger number of minterms 235 are assigned to higher level combination maps 190.

Figure 3C:
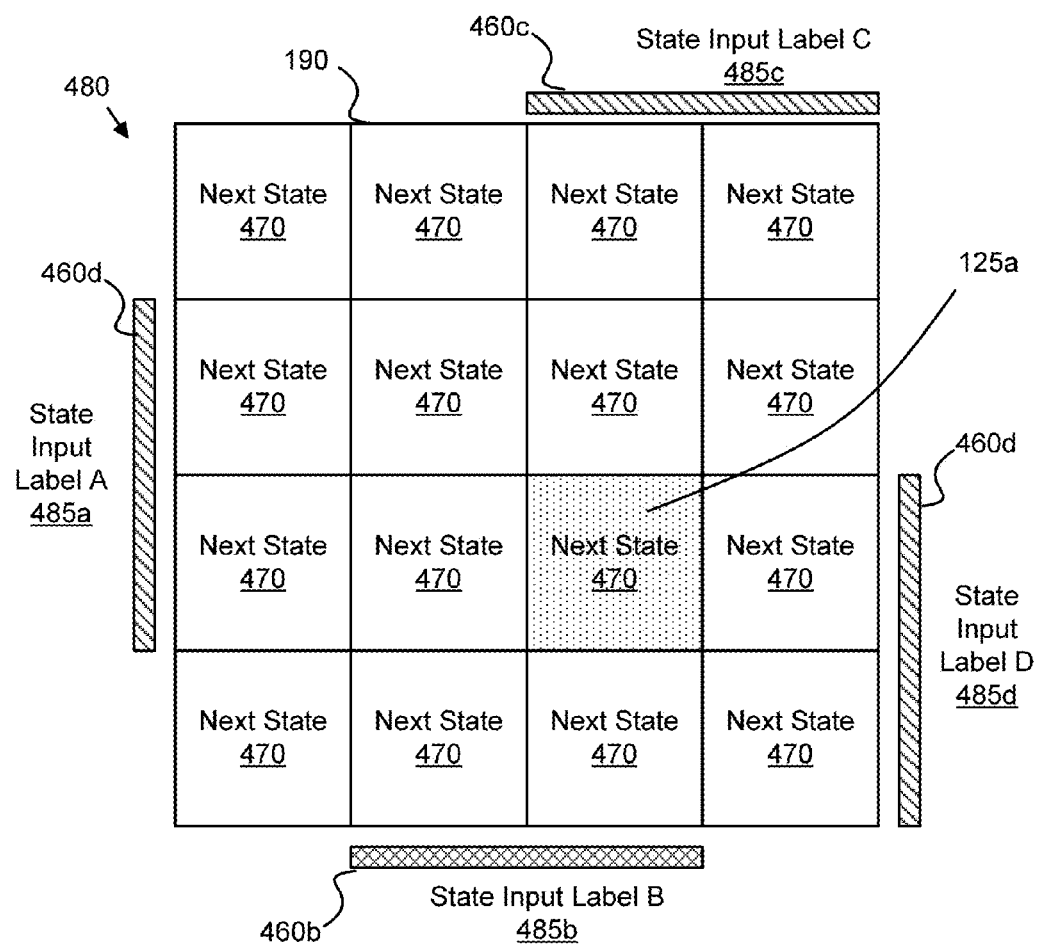
FIG. 3C is a drawing illustrating one embodiment of a combination map display.

FIG. 3C is a drawing illustrating one embodiment of a combination map display 480. A combination map 190 is displayed to the user such as on the display of a computer. State input labels 485 are shown for each state input 465 of FIG. 3B. Assertion bars 460 indicate whether each state input 465 is asserted or deasserted. Each field 125 of FIG. 3B displays a next state 470 if the state inputs 465 for the field 125 are asserted. The next state 470 may be next state values 230, a logic state identifier 210, or combinations thereof. Alternatively, the next state 470 may indicate another combination map 190 with binary input variables 215 that determine if the field 125 is asserted.

If the state inputs 465 indicated by the state input labels 485 are present state values 220, each field 125 may represent a logic state 205. A user may be prompted to enter a logic state identifier 210 for each logic state 205.

In addition, each field 125 may define an assertion value for the one or more binary output variables 225. The user may be prompted to define the assertion value 290 of a binary output variable 225 for each field 125 and/or each logic state 205.

In the depicted embodiment, a first field 125a is defined as asserted as a result of each the state inputs 465 identified by the state input labels 485 being asserted. As a result, upon completion of the logic state 205 defined by the present state values 220, the next state values 230 associated with the next state 470 will be asserted.

Figure 3D:
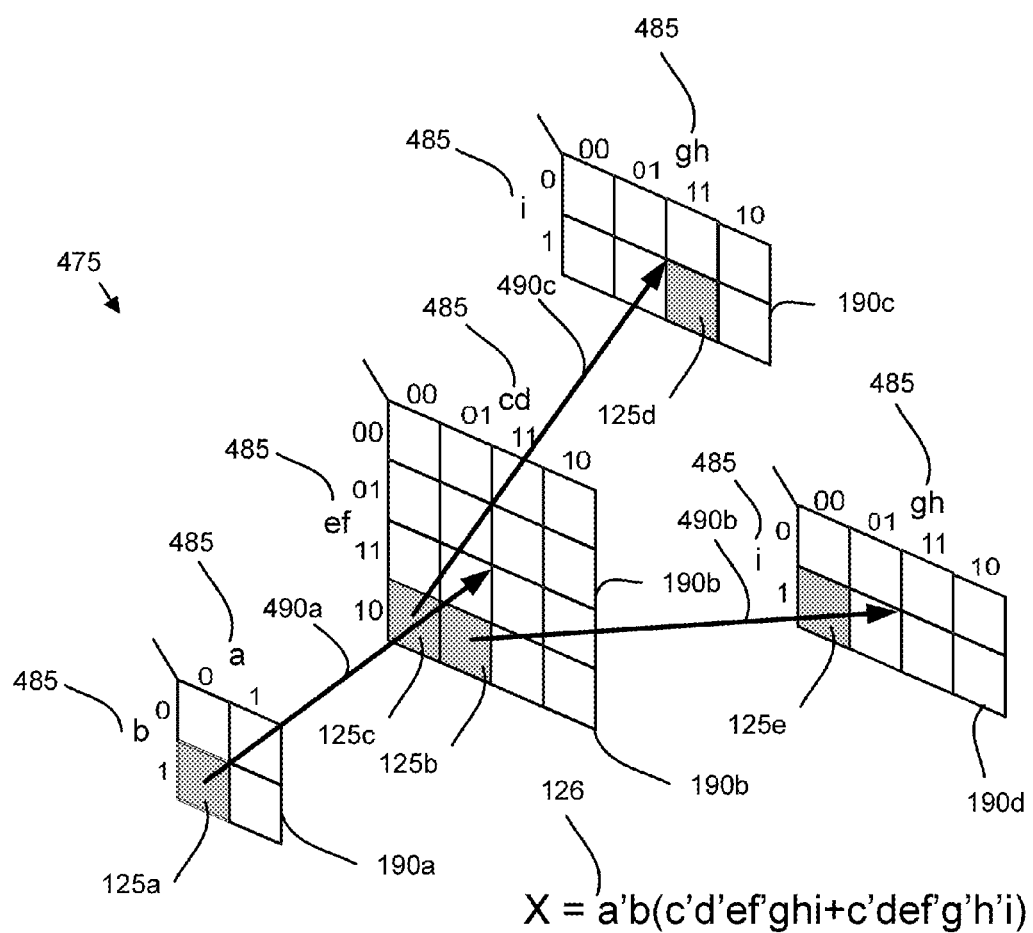
FIG. 3D is a drawing illustrating one embodiment of combination map levels.

FIG. 3D is a drawing illustrating one embodiment of combination map level display 475. A plurality of combination maps 190 are shown as though displayed on the display of the computer. Each field 125 may be organized to correspond to a logic state 205, one or more minterms 240, one or more maxterms 240, or combinations thereof.

In one embodiment, each combination map 190 on a lower level, such as combination maps 190b-d, corresponds to only one field 125 on a combination map 190 of an upper level, such as combination map 190a. The state input labels 485 may indicate the state inputs 465 such as present state values 220 and binary input variables 215 that define the fields 125. Assertion values 290 are also indicated for the state inputs 465.

In one embodiment, the fields 125 of the upper level combination maps 190 correspond to logic states 205. For example, each field 125 of the top-level combination map 190a may correspond to a logic state 205. Alternatively, the fields 125 of two or more upper level combination maps 190 may correspond to logic states 125. The state inputs 465 of the upper level combination maps 190 may be present state values 230 that indicate which logic state 205 is active.

A first field 125a of a first combination map 190a may be defined by a second combination map 190b as indicated by a first relationship arrow 490a. Each relationship arrow 490 may connect a field 125 of an upper level combination map 190 to a lower level combination map 190. The first combination map 190a may represent the present state values 220 a and b.

The second combination map 190b may represent the Boolean equation cef. A second relationship arrow 490b may indicate that a second field 125b of the second combination map 190b is defined by a fourth combination map 190d. The fourth combination map 190d may represent the Boolean equation g'h'i' as indicated by asserting a fifth filed 125e. A third relationship arrow 490c may indicate that a third field 125c is defined by a third combination map 190c. The third combination map 190c may represent the Boolean equation ghi as indicated by asserting a fourth field 125d. In the depicted embodiment, the combination map level display 475 represents the Boolean equation 126 X=a'b(c'd'ef-'ghi+c'def'g'h'i).

The plurality of combination maps 190 forms a multilevel display format. The multilevel display format has a top display level as illustrated by the first combination map 190a and at least one lower display levels as illustrated by the second and third combination maps 190b-c.

Each combination map 190 includes state input labels 485 that identify the state inputs 465 for the combination map 190. Relationship arrows 490 show the logical relationship between a combination map 190 and a field 125. The relationship arrows 490 may be defined by the relationship arrow data 175.

In one embodiment, relationship arrows 490 link a first field 125a with successive combination maps 190 at successive display levels. The relationship arrows 490 indicate a logical relationship between the fields 125.

A combination of first binary input variables 215 and/or present state values 220 for a first field 125a may be identified by selecting the first field 125a of a combination map 190a at first display level. In response to selecting the first field 125a, additional combinations of second binary input variables 215 in a successive combination map 190 that logically define the first field 125a may be identified. The combination map 190 of the second binary input variables 215 may be at a successive display level lower than the first display level.

In one embodiment, combination maps 190 of additional binary input variables 215 that logically define the selected first field 125a are displayed on combination maps 190 at each successive level until the last display level is reached. In one embodiment, the combination maps 190 may be logically collapsed. A binary output variable 225 may be assigned to the combination of all binary input variables 215 on each display level of the combination maps 190 for the selected first field 125a. In addition, the combination of all binary input variables 215 on each display level of the combination maps 190 may be converted into a logical expression 126.

Figure 4:
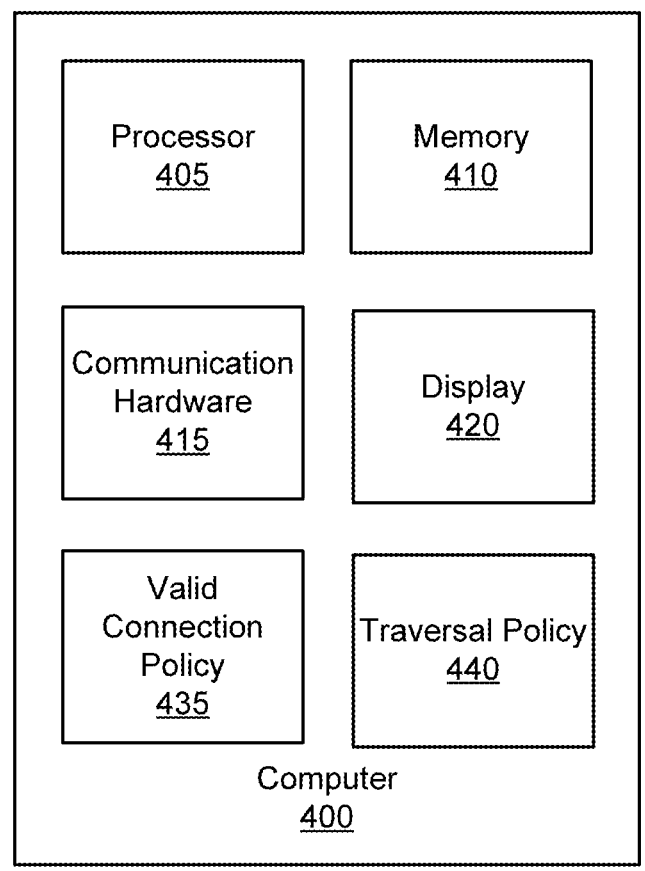
FIG. 4 is a schematic block diagram illustrating one embodiment of a computer.

FIG. 4 is a schematic block diagram illustrating one embodiment of a computer 400. The encoding module 104 and/or the connection analysis module 105 may be embodied in the computer 400. In the depicted embodiment, the computer 400 includes a processor 405, a memory 410, communication hardware 415, and a display 420. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. In addition, the communication hardware 415 may receive inputs from a user. The display 420 may communicate data to the user.

The computer 400 may also include a valid connection policy 435 and a traversal policy 440. The valid connection policy 435 and the traversal policy 440 may be organized as data structures in the memory 410. The valid connection policy 435 and the traversal policy 440 are described in more detail hereafter.

Figure 5A:
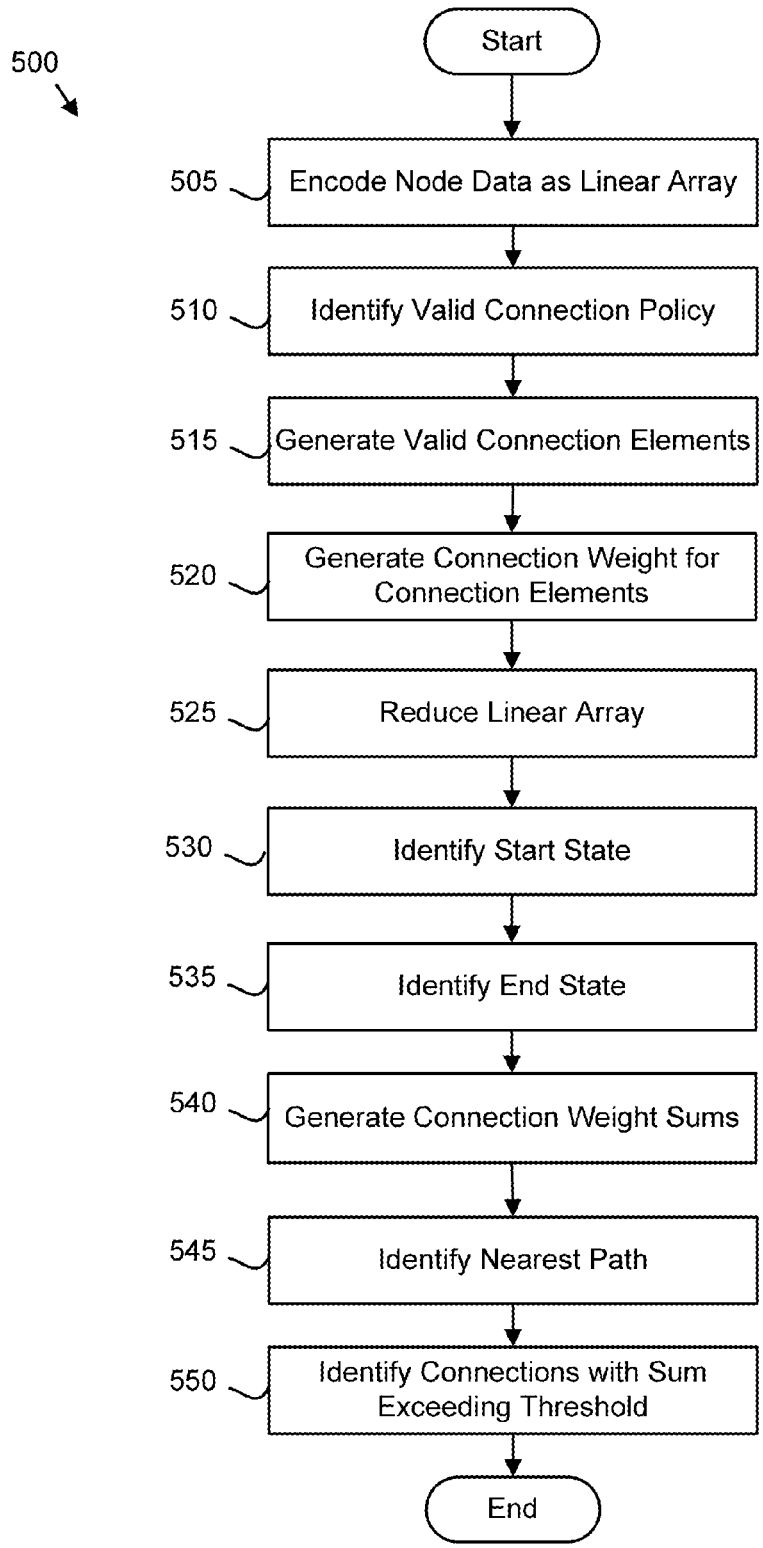
FIG. 5A is a schematic flow chart diagram illustrating one embodiment of a nearest connection identification method.

FIG. 5A is a schematic flow chart diagram illustrating one embodiment of a nearest node connection identification method 500. The method 500 may identify the nearest node connection 107 from node data 141. In addition, the method 500 may identify node connections exceeding a threshold 108 with connection weight sums 256 that exceed a connection weight sum threshold. The method 500 may be performed by the processor 405. Alternatively, the method 500 may be performed by the computer readable storage medium such as the memory 410. The memory 410 may store code that is executed by the processor 405 to perform the functions of the method 500.

The method 500 starts, and in one embodiment, the code encodes 505 the node data 141 as the linear array 200. The encoding of the node data 141 into the linear array 200 is described in more detail in FIG. 5B.

The code may identify 510 a valid connection policy 435. In one embodiment, a valid connection policy 435 is identified through a combination map 190. A user may employ the combination map 190 to identify combinations of connection elements 176 encoded as binary input variables 215 and present state values 220 that indicate a valid connection element 176 between logic states 205. The combination of connection elements 176 may form a Boolean expression. The valid connection policy 435 may be satisfied when the Boolean expression is true.

The code may generate 515 connection elements 176 between each logic state 205 that satisfies the valid connection policy 435. The valid connection policy 435 allows a large number of logic states 205 representing nodes 120 to be processed with connection elements 176 generated 515 between logic states 205 with valid connection elements 176.

In one embodiment, the code generates 520 a connection weight 246 for each connection element 176. The connection weight 246 may be parsed from the element characteristics 123 associated with a connection element relationship 173.

In one embodiment, the code reduces 525 the linear array 200 to a set of minimal logical expressions. The code may employ one or more of the Quine-McClusky algorithm and Espresso to reduce the linear array 200.

The code may identify 530 a start logic state 205 or start state. The start state may be a logic state 205 from which the nearest node connection 107 is identified. The start state may be automatically identified 530 by the code. Alternatively, the user may select the start state.

The code may further identify 535 an end logic state 205 or end state. The end state may be a logic state 205 to which the nearest node connection 107 is identified. In one embodiment, the code iteratively identifies 535 a plurality of end states. Alternatively, the user may select the end state.

The code may generate 540 a connection weight sum 256 for each node connection 109 between the start state and the end state. Each node connection 109 may be defined by node connection data 252 and comprise a plurality of connection elements 176. In one embodiment, the code sums the connection weight 246 for each connection element 176 specified by a connection element identifier 224 in the node connection data 252 to calculate the connection weight sum 256.

The code may further identify 545 the nearest node connection 107 between the start state and the end state. The connection with the minimum connection weight sum 256 may be identified 545 as the nearest node connection 107.

In one embodiment, the code identifies 550 each node connection 109 with a connection weight sum 256 that exceeds a connection weight sum threshold and the method 500 ends. The connection weight sum threshold may be specified by user. Alternatively, the connection weight sum threshold may be calculated from a design rule. For example, the connection weight sum threshold may be calculated to be a specified percentage, such as 80 percent, of the design rule. As a result, node connections 109 that are potentially incompatible with the design rule are identified 550.

Figure 5B:
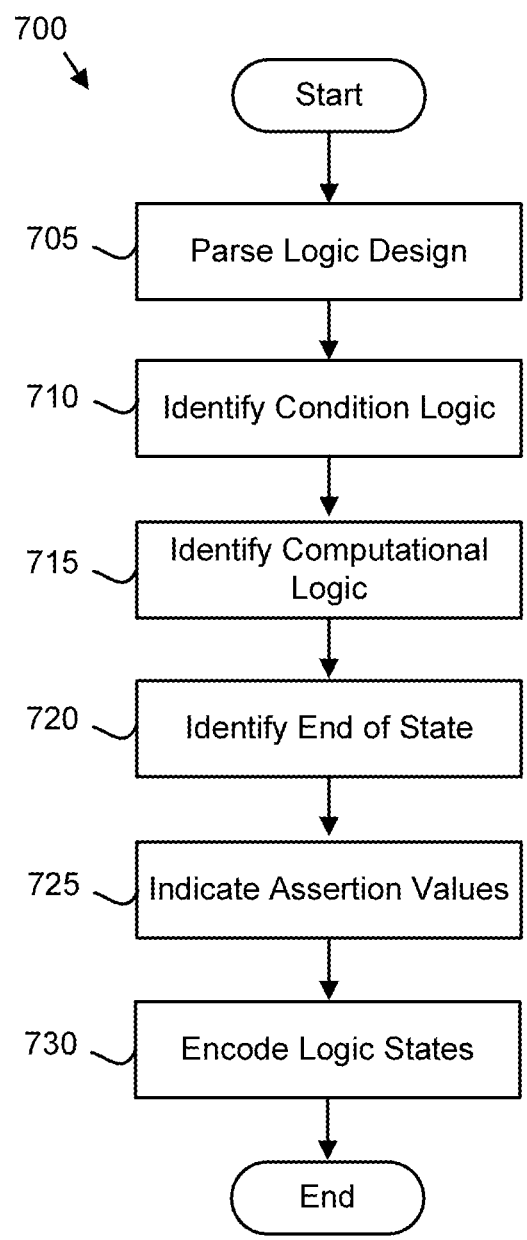
FIG. 5B is a schematic flowchart diagram illustrating one embodiment of a logic state encoding method.

FIG. 5B is a schematic flowchart diagram illustrating one embodiment of a logic state encoding method 700. The method 700 may encode the node data 141 as one or more logic states 205 of the linear array 200. The method 700 may perform step 505 of FIG. 5A. The method 700 may be performed by the processor 405. Alternatively, the method 700 may be performed by the computer readable storage medium such as the memory 410. The memory 410 may store code that is executed by the processor 405 to perform the functions of the method 700.

The method 700 starts, and in one embodiment, the code parses 705 the node data 141 into the logic transformation 150. The code may segment the node data 141 into logic design elements 130. In one embodiment, each logic design element 130 is a node 120 parses 705 each node 120 into a logic design element 130.

The code may identify 710 conditional logic 172 in each logic design element 130. The conditional logic 172 may include one or more connection elements 176 and element characteristics 123. In addition, the code may identify secondary connection elements 176 as next state values 230. For example, the logic state 205 for a person to whom the communication is directed may be identified as a next state value 230.

In addition, the code may identify 715 computational logic 134 in each logic design element 130. The computational logic 134 may includes one or more connection element relationships 173 such as communications, travel, transfers, proximity, interpersonal relationships, and the like.

In one embodiment, the code identifies 720 the end of state 136 for each logic design element 130. The end of state 136 may be an end of a node 120. Alternatively, the end of state 136 may be an end of an instance of conditional logic 172.

The code may indicate 725 assertion values 290 for the binary input variables 215, the present state values 220, the binary output variables 225, and the next state values 230. In one embodiment, an assertion indicator 295 is associated with each of the binary input variables 215, the present state values 220, the binary output variables 225, and the next state values 230. A binary input variable 215 and/or next state value 230 may be asserted if the related connection element 176 and/or connection element relationship 173 is included in the node 120 corresponding to the logic design element 130.

The code may encode 730 the logic state 205 from the logic transformation 150 and the method 700 ends. In one embodiment, the logic state 205 is assigned present state values 220. The present state values 220 may be assigned to minimize the minterms 240 and the maxterms 235 that generate the present state values 220. In addition, the next state values 230 for the logic state 205 may be generated from the next state values 230 of the logic transformation 150. In one embodiment, the next state values 230 for the logic state 205 are equivalent to the next state values 230 of the logic transformation 150.

The binary input variables 215 of the logic state 205 may be generated from the binary input variables 215 of the logic transformation 150. In one embodiment, the binary input variables 215 of the logic state 205 are equivalent to the binary input variables 215 of the logic transformation 150.

The code may further encode 730 the logic state 205 by generating the minterms 240 and the maxterms 235 from the computational logic 134. In one embodiment, the minterms 240 in the maxterms 235 are structured to be logically equivalent to the computational logic 134.

The code may further assign one or more maxterms 235 to each binary output variable 225 and/or each next state value 230. Alternatively, the code may assign one or more minterms 240 to each binary output variable 225 and/or each next state value 230.

Figure 5C:
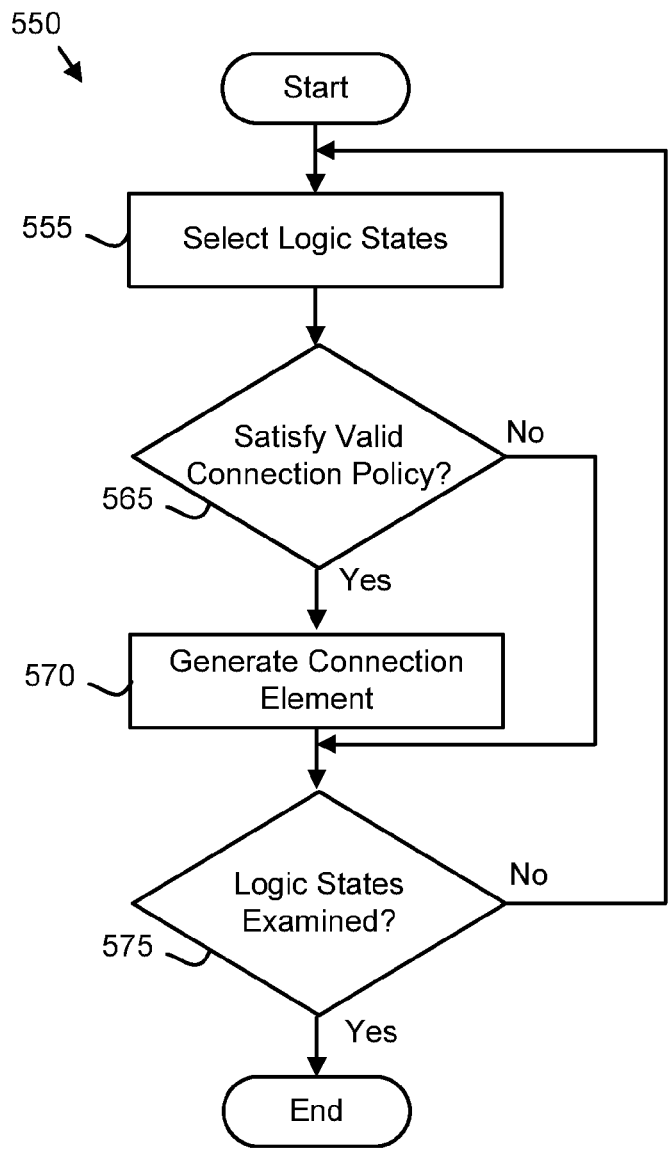
FIG. 5C is a schematic flowchart diagram illustrating one embodiment of a connection element generation method.

FIG. 5C is a schematic flowchart diagram illustrating one embodiment of a connection element generation method 550. The method 550 may generate connection elements 176 between the logic states 205 of the linear array 200. The method 550 may perform the generate valid connection elements step 515 of FIG. 5A. The method 550 may be performed by the processor 405. Alternatively, the method 550 may be performed by the computer readable storage medium such as the memory 410. The memory 410 may store code that is executed by the processor 405 to perform the functions of the method 550.

The method 550 starts, and in one embodiment, the code selects 555 two logic states 205 of the linear array 200. The selected logic states 205 may be any pair of logic states 205 that have not been previously selected together.

The code further determines 565 if a connection element 176 between the two logic states 205 satisfies the valid connection policy 435. The two logic states 205 may satisfy the valid connection policy 435 if the Boolean expression relating the logic states 205 from the combination map 190 is true.

If the valid connection policy 435 is satisfied, the code generates 570 a connection element 176 between the logic states 205. In one embodiment, the code generates 570 the connection element data 242. The code may generate 570 the connection element identifier 244. In addition, the code may append the logic state identifiers 210 for the logic states 205 to the connection element data 242.

If the valid connection policy is not satisfied or in response to generating 570 the connection element 176, the code determines 575 if all pairs of logic states 205 have been examined. If all pairs of logic states 205 have been examined, the method 550 ends. If all pairs of logic states 205 have not been examined, the code loops to select 555 a new pair of logic states 205.

Figure 5D:
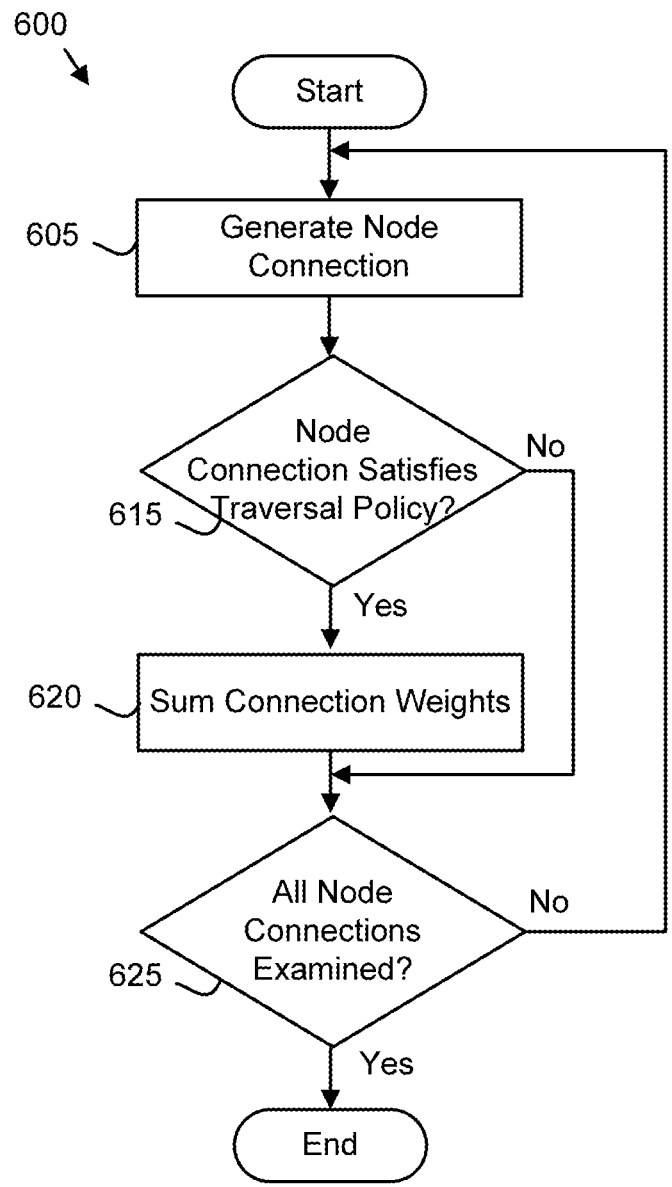
FIG. 5D is a schematic flowchart diagram illustrating one embodiment of a connection weight sum generation method.

FIG. 5D is a schematic flowchart diagram illustrating one embodiment of a connection weight sum generation method 600. The method 600 may generate connection weight sums 256 for connections between a start state and an end state. The method 600 may perform the generate connection weight sums step 540 of FIG. 5A. The method 600 may be performed by the processor 405. Alternatively, the method 600 may be performed by the computer readable storage medium such as the memory 410. The memory 410 may store code that is executed by the processor 405 to perform the functions of the method 600.

The method 600 starts, and in one embodiment, the code generates 605 a node connection 109 between the start state and the end state. The code may generate 605 unique node connection data 252 that identifies connection elements 176 connecting the start state to the end state. No other node connection data 252 may include the same uniquely ordered set of connection elements 176.

The code may further determine 615 if the node connection 109 satisfies the traversal policy 440. In one embodiment, the traversal policy 440 is satisfied if the connection weight sum 256 of the node connection data 252 for the node connection 109 surpasses a weight threshold. For example, if the weight threshold is 300 minutes and the connection weight sum 256 is 200 minutes, the node connection 109 may not satisfy the traversal policy 440. The traversal policy 440 may filter out node connections 109 that are unlikely to be the nearest node connection 107, reducing the computational requirements of identifying the nearest node connection 107.

In one embodiment, the traversal policy 440 is not satisfied if a number of 111 connection elements included in the node connection 109 from the start state to the end state exceeds the maximum connection element threshold. For example, the maximum connection element threshold may be 11 connection elements 176. If the node connection 109 includes 13 connection elements 176, the node connection 109 may not satisfy the traversal policy 440.

If the traversal policy 440 is not satisfied, the code determines 625 if all node connections 109 have been examined. If the traversal policy 440 is satisfied, the code may sum 620 the connection weights 246 of the connection elements 176 for the node connection 109 to generate the connection weight sum 256. The traversal policy 440 may reduce the number of node connections 109 that are traversed, reducing the computational resources required to identify the nearest node connection 107.

In response to summing 620 the connection weights 246 or if the traversal policy 440 is not satisfied, the code determine 625 if all node connections 109 have been examined. If all node connections 109 of not been examined, the code loops to generate 605 a new node connection 109. If all node connections 109 have been examined, the method 600 ends.

Figure 6:
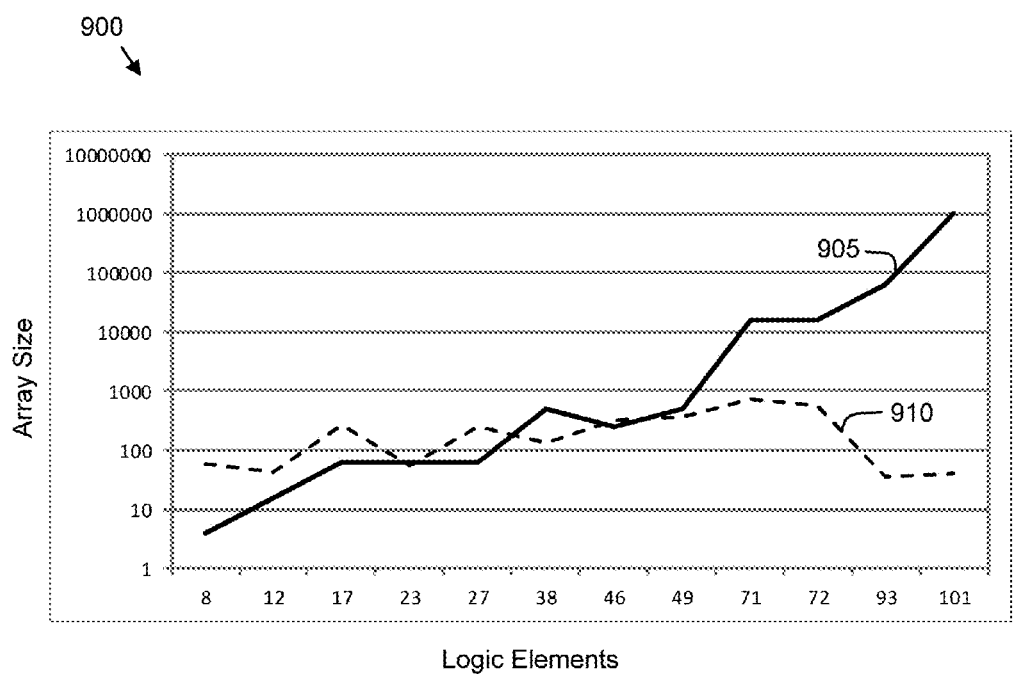
FIG. 6 is a graph illustrating one embodiment of array complexity.

FIG. 6 is a graph 900 illustrating one embodiment of array complexity. The graph 900 shows an array size 905 for a multidimensional array of the node data 141 and an array size 910 for a corresponding linear array 200 for multiple pairs of identical function implementations with various numbers of connection elements 176. For example, a first function implementation of 27 connection elements 176 may be implemented as a pair of arrays comprising a multidimensional array and a linear array 200. The array size 905, 910 is shown on a log scale. Array size 905, 910 is one measure of array complexity and a good predictor of the computational overhead required to process an array.

The graph 900 illustrates that the array size 905 for multidimensional array implementations quickly becomes orders of magnitude larger than the corresponding array size 910 for linear array implementations. By encoding the node data 141 as a linear array 200, array size is greatly reduced, reducing the computational complexity of processing the linear array 200.

The embodiments identify a nearest node connection 107 for a plurality of nodes 120 in node data 141. The embodiments encode the nodes 120 as logic states 205 in a linear array 200 to reduce the complexity of analyzing the node data 141 to determine the nearest node connection 107. The embodiments further identify a valid connection policy 435 using combination maps 190 of the linear array 200 and generate connection elements 176 between logic states 205 that satisfy the valid connection policy 435. The connection elements 176 are then efficiently processed and analyzed to identify the nearest node connection 107.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    encoding, by use of a processor, node data as a linear array comprising a plurality of logic states, wherein each logic state represents a node of node data and each logic state comprises one or more binary output variables, one or more binary input variables, one or more minterms of the one or more binary input variables, one or more maxterms of the one or more minterms, one or more present state values, and one or more next state values;
    identifying a valid connection policy for a valid connection element between two logic states of a plurality of logic states;
    generating a connection element between each two logic states of the plurality of logic states that satisfy the valid connection policy through a combination map, wherein each connection element comprises a connection weight;
    iteratively generating a connection weight sum for each node connection between a start state and an end state, wherein each node connection comprises one or more connection elements and a given connection element is not traversed to generate the connection weight sum in response to the node connection satisfying a traversal policy; and
    identifying a first node connection between the start state and the end state with a minimum connection weight sum as a nearest node connection.

2. The method of claim 1, the method further comprising identifying each node connection with a connection weight sum that exceeds a connection weight sum threshold.

3. The method of claim 1, wherein the valid connection policy comprises at least one combination of binary input variables and present state values.

4. The method of claim 3, wherein the combination of binary input variables and present state values is a Boolean expression and the valid connection policy is satisfied if the Boolean expression is true.

5. The method of claim 1, wherein the traversal policy is satisfied if a connection weight sum for the node connection surpasses a weight threshold.

6. The method of claim 1, wherein the traversal policy is not satisfied if a number of connection elements in the node connection exceeds a maximum connection element threshold.

7. The method of claim 1, wherein the connection weight is a time interval.

8. The method of claim 1, wherein the connection weight is an activity metric.

9. The method of claim 1, the method further comprising:
    parsing the node data into a plurality of logic design elements;
    identifying conditional logic for each logic design element;
    identifying computation logic for each logic design element; and
    identifying an end of state logic design element.

10. The method of claim 1, wherein the plurality of logic states are displayed as a plurality of fields, the plurality of fields organized by:
    organizing the plurality of binary input variables into the plurality of fields in one or more combination maps, each field of the plurality of fields corresponding to a respective display level of a multi-level display format having a top display level combination map and at least one lower display level combination map;
    selecting a first field of the plurality of fields, the first field corresponding to a first display level;
    identifying combinations of the binary input variables of a successive combination map that logically defines the first field of the plurality of fields, wherein the successive combination map is at a successive display level lower than the first display level;
    displaying at each successive display level, combination maps of additional binary input variables that logically define the first field at each successive level until a last display level is reached; and converting the combination of binary input variables for each display level into a logical expression.

11. A program product comprising a non-transitory computer readable storage medium that stores code executable by a processor, the executable code comprising code to perform:
- encoding node data as a linear array comprising a plurality of logic states, wherein each logic state represents a node of node data and each logic state comprises one or more binary output variables, one or more binary input variables, one or more minterms of the one or more binary input variables, one or more maxterms of the one or more minterms, one or more present state values, and one or more next state values;
- identifying a valid connection policy for a valid connection element between two logic states of a plurality of logic states;
- generating a connection element between each two logic states of the plurality of logic states that satisfy the valid connection policy through a combination map, wherein each connection element comprises a connection weight;
- iteratively generating a connection weight sum for each node connection between a start state and an end state, wherein each node connection comprises one or more connection elements and a given connection element is not traversed to generate the connection weight sum in response to the node connection satisfying a traversal policy; and
- identifying a first node connection between the start state and the end state with a minimum connection weight sum as a nearest node connection.

12. The program product of claim 11, the code further performing identifying each node connection with a connection weight sum that exceeds a connection weight sum threshold.

13. The program product of claim 11, wherein the valid connection policy comprises at least one combination of binary input variables and present state values.

14. The program product of claim 13, wherein the combination of binary input variables and present state values is a Boolean expression and the valid connection policy is satisfied if the Boolean expression is true.

15. The program product of claim 11, wherein the traversal policy is satisfied if a connection weight sum for the node connection surpasses a weight threshold.

16. The program product of claim 11, wherein the traversal policy is not satisfied if a number of connection elements in the node connection exceeds a maximum connection element threshold.

17. An apparatus comprising:
- a processor;
- a non-transitory memory that stores code executable by the processor to perform:
  - encoding node data as a linear array comprising a plurality of logic states, wherein each logic state represents a node of node data and each logic state comprises one or more binary output variables, one or more binary input variables, one or more minterms of the one or more binary input variables, one or more maxterms of the one or more minterms, one or more present state values, and one or more next state values;
  - identifying a valid connection policy for a valid connection element between two logic states of a plurality of logic states;
  - generating a connection element between each two logic states of the plurality of logic states that satisfy the valid connection policy through a combination map, wherein each connection element comprises a connection weight;
  - iteratively generating a connection weight sum for each node connection between a start state and an end state, wherein each node connection comprises one or more connection elements and a given connection element is not traversed to generate the connection weight sum in response to the node connection satisfying a traversal policy; and
  - identifying a first node connection between the start state and the end state with a minimum connection weight sum as a nearest node connection.

18. The apparatus of claim 17, wherein the processor further identifies each node connection with a connection weight sum that exceeds a connection weight sum threshold.

19. The apparatus of claim 17, wherein the valid connection policy comprises at least one combination of binary input variables and present state values.

20. The apparatus of claim 19, wherein the combination of binary input variables and present state values is a Boolean expression and the valid connection policy is satisfied if the Boolean expression is true.

* * * * *